United States Patent
Olson et al.

(10) Patent No.: US 9,691,419 B1
(45) Date of Patent: Jun. 27, 2017

(54) ESD PROTECTION SURFACE CHARGE CONTROL RECORDING HEAD

(71) Applicant: Seagate Technology LLC, Cupertino, CA (US)

(72) Inventors: Daniel W. Olson, Minneapolis, MN (US); John M. Wolf, Maple Grove, MN (US); Declan Macken, Eden Prairie, MN (US); Gavin L. Brinkley, Derry (GB)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/973,333

(22) Filed: Dec. 17, 2015

(51) Int. Cl.
*G11B 5/40* (2006.01)
*G11B 5/455* (2006.01)

(52) U.S. Cl.
CPC ............... *G11B 5/455* (2013.01); *G11B 5/40* (2013.01)

(58) Field of Classification Search
None
See application file for complete search history.

(56) References Cited

U.S. PATENT DOCUMENTS

| | | | |
|---|---|---|---|
| 4,317,149 A | 2/1982 | Elser et al. | |
| 5,465,186 A | 11/1995 | Bajorek et al. | |
| 5,491,605 A | 2/1996 | Hughbanks et al. | |
| 5,494,473 A * | 2/1996 | Dupuis | B24B 37/048 29/603.09 |
| 5,638,237 A * | 6/1997 | Phipps | G01R 33/09 360/128 |
| 5,759,428 A * | 6/1998 | Balamane | B23K 26/362 219/121.66 |
| 5,812,349 A * | 9/1998 | Shouji | G11B 5/40 360/245.8 |
| 6,400,534 B1 | 6/2002 | Klaassen | |
| 6,650,511 B2 * | 11/2003 | Hsiao | B82Y 10/00 360/323 |
| 7,046,473 B2 | 5/2006 | Fu et al. | |
| 7,119,995 B2 | 10/2006 | Granstrom et al. | |
| 7,199,982 B2 | 4/2007 | Suk | |
| 7,321,476 B2 | 1/2008 | Baumgart et al. | |
| 7,389,577 B1 | 6/2008 | Shang et al. | |
| 7,469,468 B1 * | 12/2008 | Cross | G11B 5/3166 216/62 |
| 7,707,707 B2 * | 5/2010 | Seagle | G11B 5/11 29/603.12 |
| 8,199,444 B2 * | 6/2012 | Golcher | G11B 5/11 360/323 |
| 8,400,736 B2 * | 3/2013 | Greminger | G11B 5/4853 360/234.5 |

(Continued)

FOREIGN PATENT DOCUMENTS

| | | | | |
|---|---|---|---|---|
| JP | 2000315303 A | * | 11/2000 | |
| JP | 2001143225 A | * | 5/2001 | |
| WO | WO 0224395 A1 | * | 3/2002 | ......... B23K 26/0624 |

Primary Examiner — Will J Klimowicz
(74) Attorney, Agent, or Firm — Hall Estill Attorneys at Law

(57) ABSTRACT

Electrostatic discharge protection can be afforded to a data recording head in accordance with various embodiments. A data recording head may consist of a circuit having a preamp ground connected to a ground substrate via a ground trace. The ground trace can consist of a first leg connected to the ground substrate and a second leg with an open connection extending from a dice line.

18 Claims, 3 Drawing Sheets

(56) References Cited

U.S. PATENT DOCUMENTS

| | | |
|---|---|---|
| 8,599,506 B2 | 12/2013 | Contreras et al. |
| 8,630,057 B2 | 1/2014 | Murthy et al. |
| 8,786,975 B2 * | 7/2014 | Inoue .................. G11B 5/3166 360/234.5 |
| 8,995,076 B1 | 3/2015 | Olson et al. |
| 9,202,497 B2 | 12/2015 | Rea et al. |
| 2008/0037182 A1 * | 2/2008 | Albrecht .................. G11B 5/40 360/323 |
| 2009/0296284 A1 * | 12/2009 | Gill ........................ B82Y 10/00 360/319 |

* cited by examiner

ESD PROTECTION SURFACE CHARGE CONTROL RECORDING HEAD

SUMMARY

Electrostatic discharge protection is provided, in accordance with some embodiments, in a data recording head consisting of a circuit having a preamp ground connected to a ground substrate via a ground trace. The ground trace consists of a first leg connected to the ground substrate and a second leg with an open connection extending from a dice line.

DETAILED DESCRIPTION

With increased precision and speed of modern data storage device manufacturing systems, electrostatic discharge (ESD) can degrade or destroy circuitry and components. Data recording heads can be particularly susceptible to ESD during manufacturing with multiple components being grounded at a common location. Hence, various embodiments are directed to provide reduced recording head resistance during manufacturing to decrease the risk of ESD damage and increased recording head resistance to allow sophisticated data access operations to be conducted by the recording head.

In a non-limiting example, a surface charge control circuit of a data transducing head has a preamplifier (preamp) ground pad connected to a ground substrate via a ground trace that has a first leg connected to the ground substrate and a second leg terminating in an open connection. During manufacturing and testing, the second leg of the ground trace electrically shorts the first leg to decrease the resistance of the surface charge control circuit and protect the circuit from ESD damage. Simple severing of the second leg of the ground trace allows the resistance of the first leg to be realized to enable surface charge control that manipulates the position of a transducing head relative to a data storage medium.

Figure 1:
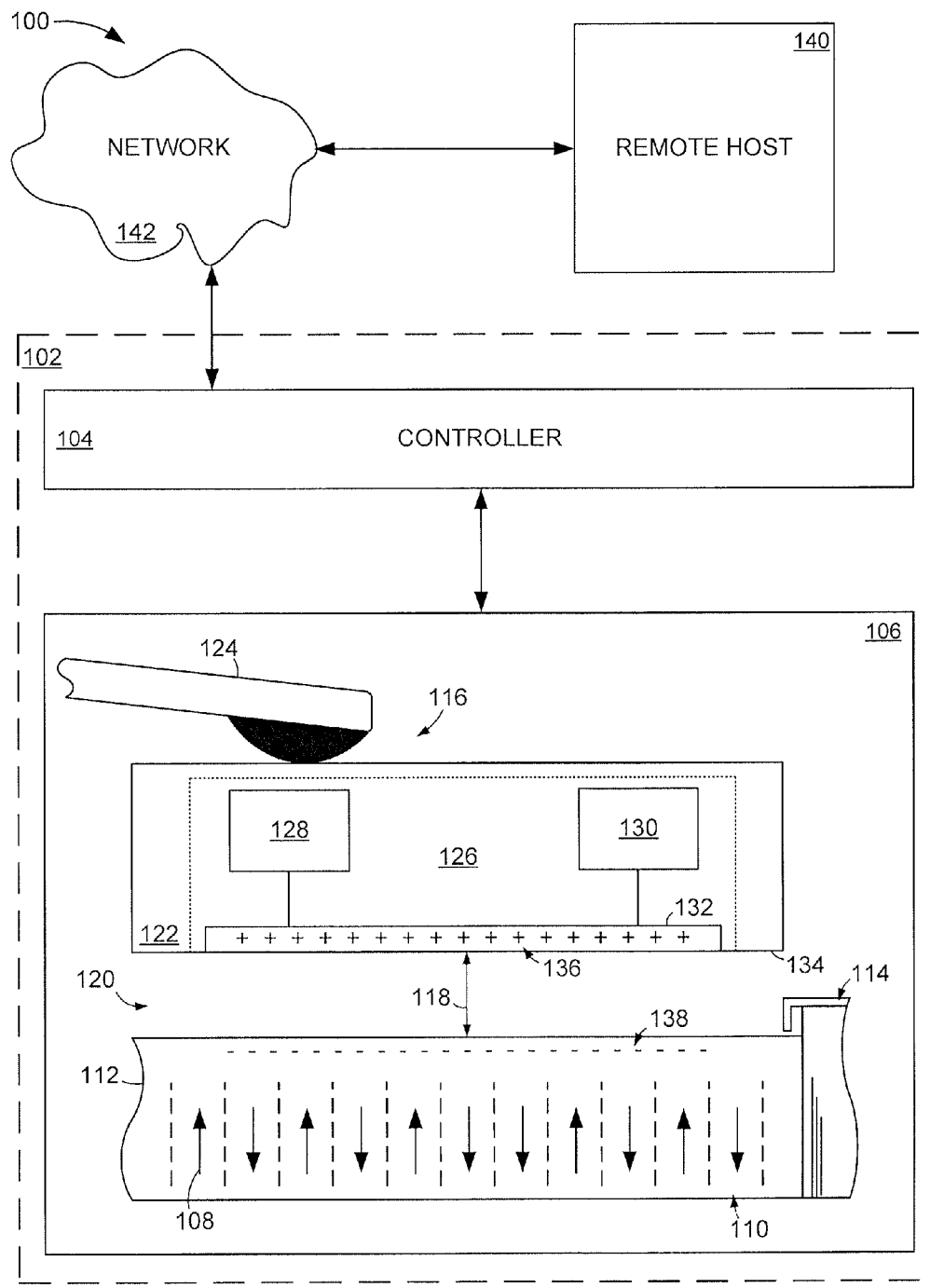
FIG. 1 is a line representation of an example portion of a data storage system configured and operated in accordance with some embodiments.

FIG. 1 generally displays an example data storage system 100 in which ESD protection can be employed. The system 100 is arranged in accordance with assorted embodiments to store and retrieve data with any number of data storage devices 102. Although not required or limiting, each data storage device 102 comprises one or more local controllers 104 and a data transducing system 106. The portion of a data transducing system 106 shown in FIG. 1 illustrates how a plurality of magnetic data bits 108 can be perpendicularly stored in and read from data tracks 110 on a data medium 112 that is controlled by a centrally positioned spindle motor 114. It is noted that any data bits 108 can be stored and read with a diverse variety of storage techniques, without limitation, such as longitudinal bit recording, heat assisted magnetic recording, and two-dimensional data recording.

The data bits 108 are accessed via an actuating assembly 116 that is suspended a predetermined distance 118 above the data medium 112 on what can be characterized as an air bearing 120. The actuating assembly 116 can be articulated to adjust the size of the air bearing 120 and position data reader and/or data writer portions of the transducing head 122. In this way, the local controller 104 can dictate data access to and from the data medium 112 across the air bearing 120 by spinning the spindle motor 114 and articulating the suspension 124.

In some embodiments, a surface charge control circuit 126 is resident on, or interconnected to, the transducing head 122 and has first 128 and second 130 voltage sources electrically connected to a substrate 132 positioned on an air bearing surface 134. The substrate 132 is held at a fixed, or oscillating, charge by configuring the voltage sources 128 and 130 to be different, non-zero values. In other words, a substrate charge 136, as shown by plus signs that are not restrictive to a positive polarity charge, is generated in the substrate 132 by configuring the voltage sources 128 and 130 to be different and non-zero values.

The charge resident in the substrate 132 can be altered in strength and polarity by adjusting the non-zero voltages of the respective voltage sources 128 and 130. A surface charge 138 in the data storage medium 112, which is shown as negative signs that is not restrictive to a negative polarity charge, can electrostatically interact with the substrate charge 136 to attract, or reduce attractive force from, the transducing head 122 to the data storage medium 112. The medium surface charge 138 may be static or dynamic, which can be compensated for by altering the substrate charge 136 via the respective voltage sources 128 and 130.

Through the manipulation of the substrate charge 136 relative to the medium charge 138 the distance 118 between the head 122 and medium 112 can be increased, or decreased, quickly and accurately. In contrast, a piezoelectric actuator or heat controlled protrusion can be slow, power hungry, and too imprecise to accurately control the head media spacing 118 and optimize data storage and retrieval by the transducing head 122. For example, configuring the transducing head 122 for heat assisted magnetic recording (HAMR) can rely heavily on the head media spacing 118 for accurate operation as small differences in modeled and actual head media spacing 118 can result in too little, or too much heat being applied to the data storage medium.

It should be noted that control of the data transducing system 106 is not limited to the local controller 104 as various remote hosts 140, such as a processor, server, or node, can concurrently and individually utilize the transducing system 106 across one or more wired or wireless networks 142 via appropriate communications protocol. The ability to connect a data storage device 102 to remote host(s) 140 allows the data storage device 102 to be utilized as part of a larger data storage system 100, such as in a cloud computing environment, and allows for the local controller 104 to be supplemented by other remote processing means, which can increase data accessing efficiency.

As demand for increased data capacity rises, the physical and practical size of the transducing head 122 has decreased to provide greater data bit 108 areal density. Such decreased transducing head 122 size corresponds with a premium being placed on real estate on the transducing head 122. The use of bleed resistors in a transducing head 122 to mitigate ESD damage can occupy valuable real estate that could be utilized for data accessing components and circuitry.

Accordingly, assorted embodiments mitigate transducing head 122 ESD damage during manufacturing without occupying valuable head real estate with bleed resistors.

Figure 2:
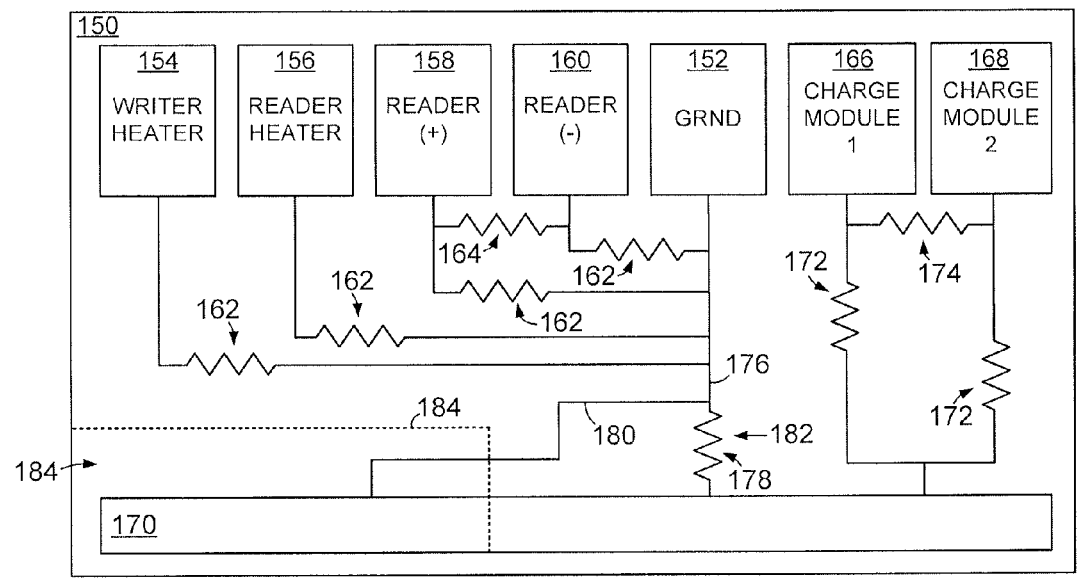
FIG. 2 represents a portion of an example transducing head capable of being utilized in the data storage system of FIG. 1.

FIG. 2 represents a portion of an example surface charge control (SCC) circuit 150 that can be employed in the data storage system 100 of FIG. 1. The SCC circuit 150 is shown in a non-limiting configuration where a ground pad 152 (GRND) that is electrically connected to a data writer heater 154 (WRITER HEATER), a data reader heater 156 (READER HEATER), a positive terminal of the reader circuit 158 (READER (+)), and a negative terminal of the reader circuit 160 (READER (−)). The resistors 162 can be configured to be similar, or dissimilar, resistance values (Ohms) that allow operation of the respective heater and data reading components. It is noted that the various aspects of the SCC circuit 150 can be concurrently located on a single common wafer during and after fabrication and incorporation into a transducing head 122.

The terminals of the reader circuit 158 and 160, are connected by an additional resistor 164. The SCC circuit 150 also has first 166 and second 168 surface charge control modules (CHARGE MODULE 1 and CHARGE MODULE 2) that can individually and collectively generate static and oscillating surface charge at one of a plurality of different frequencies. Each surface charge control module 166 and 168 is electrically connected to a substrate 170 via resistors 172, which may have matching or different resistance values. In this example, a balancing resistor 174 interconnects the first and second surface control module traces. The ground pad 152 may be connected to, or an integrated part of, a preamplifier. As such, the ground pad 152 can be characterized as a preamp ground.

The ground pad 152 is electrically connected to the substrate 170 via a ground trace 176. For operation of the SCC circuit 150, the ground trace 176 has a circuit resistor 178 that is a predetermined resistance, such as 40 k Ohms. The combination of the circuit resistor 178 and the resistance of the resistors 172 of the charge control modules 166 and 168, which can be any value, but in some embodiments is 10 k Ohms, can provide an overall circuit resistance that is susceptible to ESD damage during fabrication. That is, the combined resistance of resistors 178 and 172 can increase the likelihood of ESD damaging some, or all, of the SCC circuit 150.

To mitigate the risk of ESD damage, the ground trace 176 is constructed with a shorted leg 180 that electrically bypasses the resistor leg 182 of the ground trace 176 to decrease the overall resistance of the SCC circuit 150 during fabrication. While the shorted leg 180 may have one or more resistors incorporated thereon, it is contemplated that the shorted leg 180 has a near-zero resistance so that the overall circuit resistance during construction and testing of the SCC circuit 150 is the resistance of the charge control module resistors 172, such as 10 k Ohms. The increased resistance between substrate 170 and ground pad 152, due to circuit resistor 178, can increase the likelihood of ESD damaging the data reader circuit, the data writer heater circuit 154, and the data reader heater circuit 156.

Although the position of the shorted leg 180 is not limited to a particular path, various embodiments extend the shorted leg 180 across a dice line 184. The dice line 184 can define an area 184 of the SCC circuit wafer that is to be removed prior to SCC circuit 150 operation in a data storage system 100. The dice line 184 is illustrated as a segmented line to convey that the shorted leg 180 can remain electrically connected to the substrate 170 to short the ground trace 176 during SCC circuit 150 fabrication and testing prior to being severed to allow the circuit resistor 178 to be realized and the overall circuit resistance to increase.

Figure 3:
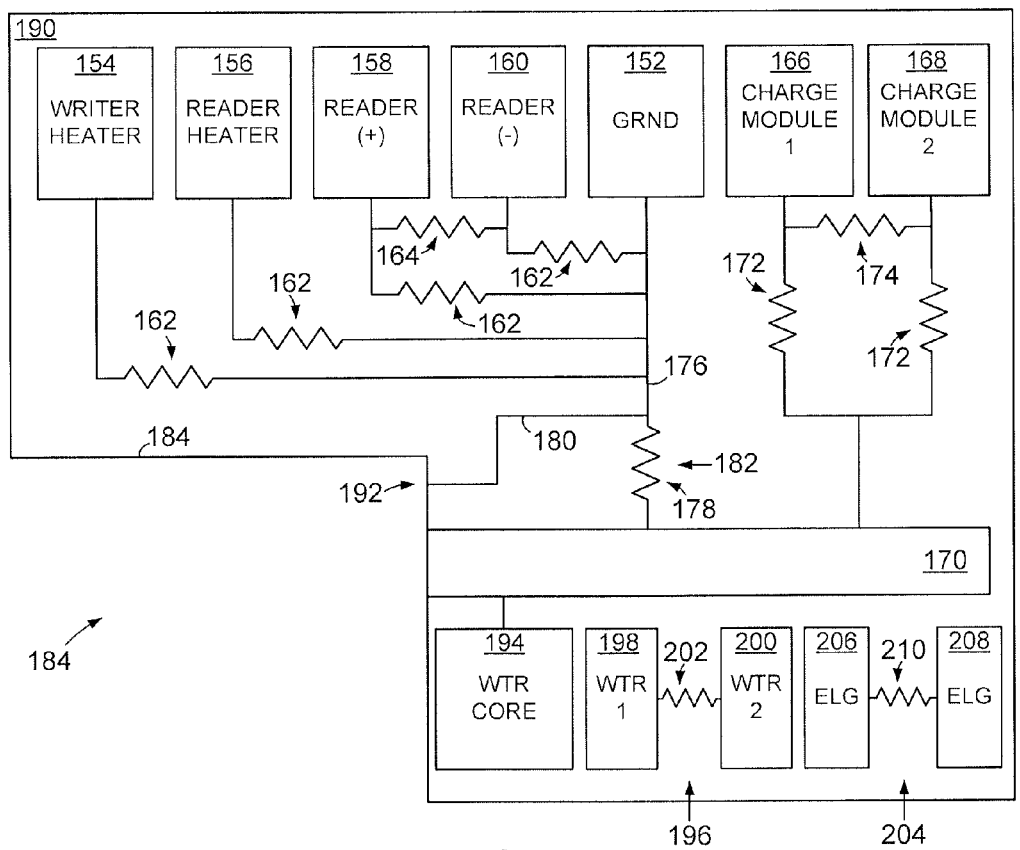
FIG. 3 illustrates a line representation of an example surface charge control circuit configured in accordance with various embodiments.

FIG. 3 displays a line representation of a portion of an example SCC circuit 190 subsequent to wafer processing carried out in accordance with various embodiments to remove portions of the SCC wafer along the dice line 184. By extending the shorted leg 180 of the ground trace 176 across the dice line 184, a material removal process severs the shorted leg 180 and results in the resistor leg 182 being the only electrical connection between the ground pad 152 and the substrate 170.

With the severing of the shorted leg 180, an open connection 192 is created at the dice line 184. An open connection 192 is a non-electrically connected conductive trace with a terminating end surrounded by electrically insulating material. While not limiting, the open connection 192 of FIG. 3 extends from a physical edge of the circuit 190 wafer that coincides with the dice line 184 without providing an electrical connection from the ground trace 176 to any other electrically conductive pad, trace, or component.

By creating the open connection 192, the SCC circuit 190 has an increased overall resistance compared to when the shorted leg 180 is electrically connected to the substrate 170 due to the circuit resistor 178 being realized. As a non-limiting example, the grounded resistance to the substrate 170 can transition from a 10 k Ohm value when the shorted leg 180 is connected to the substrate 170 to a 50 k Ohm value when the open connection 192 is created and the circuit resistor 176 contributes to the circuit 190 resistance. It is noted that the resistance of the circuit resistor 178 may be necessary to operate various portions of the SCC circuit 190. That is, while the shorted leg 180 is connected to the substrate 170, some aspects of the SCC circuit 190, such as the data reader 158 and 160 and/or heaters 154 and 156 may not function.

As shown, the substrate 170 may be concurrently connected to a writer core 194 (WTR CORE) along with the ground pad 152 and charge control modules 166 and 168. The connection with the writer core 194 can provide a grounded pathway that allows the writer core 194 to generate magnetic flux that is subsequently used to program data bits, such as bits 108 of FIG. 1, with a data writer, which is represented as a writer circuit 196 consisting of first 198 and second 200 writer pads (WTR 1 and WTR 2) connected by at least one writer resistor 202. The SCC circuit 190 further comprises an electronic lap guide (ELG) circuit 204 that has first 206 and second 208 ELG pads connected by one or more resistors 210.

Figure 4:
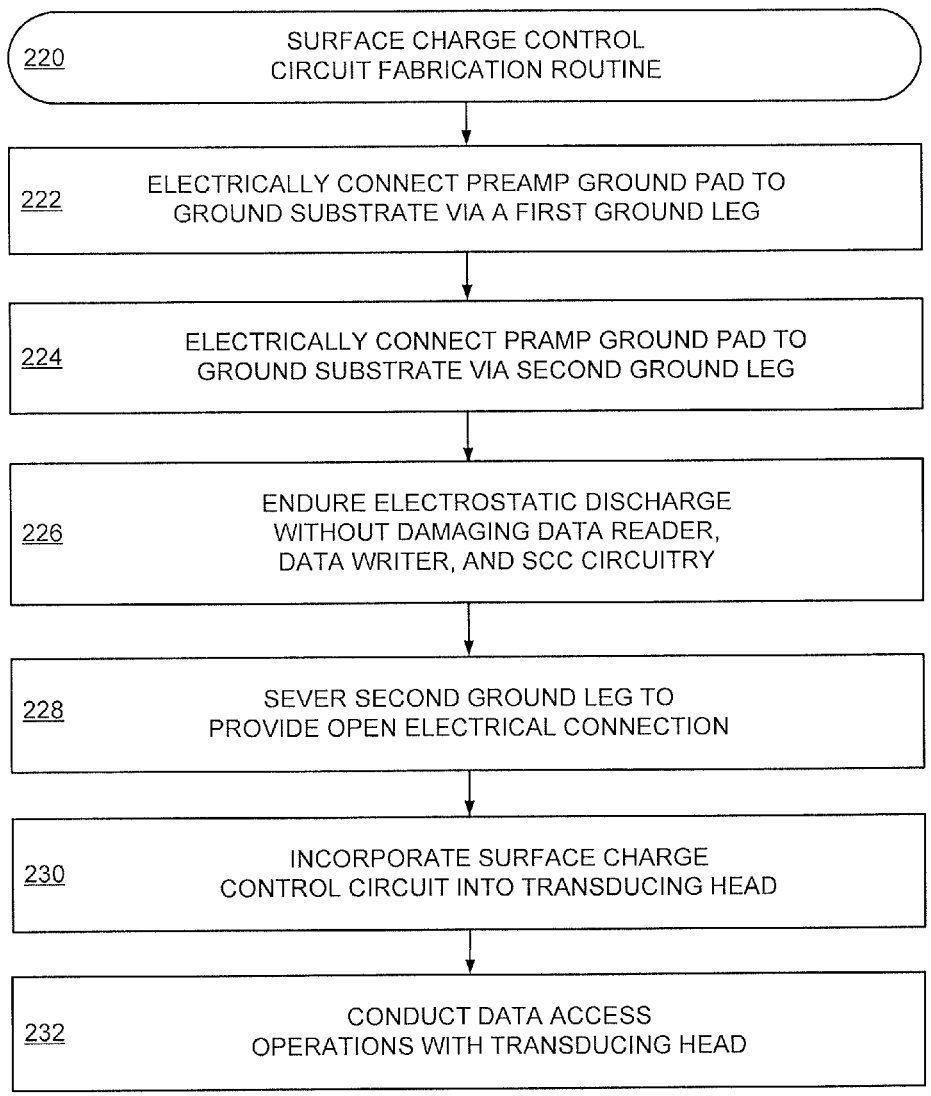
FIG. 4 provides an example surface charge control circuit fabrication routine that is carried out in some embodiments by the data storage system of FIG. 1.

FIG. 4 is a flowchart of an example surface charge control circuit fabrication routine 220 that can be performed in accordance with some embodiments to mitigate the risk of ESD damage to various portions of a transducing head. The routine 220 can begin in any way and at any time during the fabrication and testing of a transducing head. In the non-limiting embodiment shown in FIG. 4, step 222 initially establishes an electrical connection between a preamp ground pad to a ground substrate via a first ground leg of a ground trace. It is contemplated that the preamp ground pad and ground substrate are collocated on a single common wafer and the first ground leg has a resistor of a predetermined resistance, such as 40 k Ohms, positioned between the ground trace and the ground substrate.

Step 224 electrically connects the preamp ground pad to the ground substrate via a second ground leg of the ground trace that does not have a resistor and functions to short the first ground leg. It is noted that steps 222 and 224 may be executed concurrently or successively to create separate electrical connections between the preamp ground pad and the substrate ground. While the second ground leg shorts the first ground leg, step 226 endures an electrostatic discharge proximal the circuit without damaging data reader, data writer, and surface charge module circuitry of the surface charge control circuit. By shorting the first ground leg with the second ground leg, the overall circuit resistance is low, such as 10 k Ohms, and ESD has a reduced risk of degrading portions of the surface charge control circuit.

In some embodiments, numerous manufacturing, assembly, and testing processes are conducted prior to step 228 severing the second ground leg along a dice line to provide an open connection in the second ground leg. The severing of the second ground leg in step 228 may coincide with the removal of portions of the circuit wafer and/or ground substrate. With the second ground leg terminating at an open connection that allows the resistance of the first ground leg to be realized, step 230 incorporates the surface charge control circuit into a transducing head. Such incorporation may involve physical and/or electrical connection of the surface charge control circuit to one or more components, such as local controllers and amplifiers, which are adapted to conduct data access operations in step 232.

The data access operations of step 232 can consist of any number and type of transducing head operation that may, or may not, involve a data reader and/or data writer. For example, step 232 may conduct data access operations by distance between the transducing head and a data storage medium. As another example, step 232 can employ one or more head articulating means, such as a heater protrusion and the surface charge control, while data is written to and/or read from the data storage medium. The use of the surface charge control at will allows the transducing head to have a fine grain suspension control that is conducive to high data areal density data storage environments.

With the addition of the second ground leg of the ground trace connecting the preamp ground to the ground substrate, the overall resistance of the surface charge control circuit is reduced, which reduces the risk of ESD damage. The position of the second ground leg across the dice line of the circuit wafer allows for efficient severing of the second ground leg and creation of an open connection that increases the circuit resistance with realization of the first ground leg resistance. The ability to fabricate the surface charge control circuit with a lower resistance than during data access operations saves the delicate electrical components of the circuit while occupying minimal physical space on the circuit wafer.

It is noted that the various embodiments are not limited to a data storage devices as the technology can readily be utilized in any number of other applications, such as switches and other electrical closure applications. It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed.

What is claimed is:

1. An apparatus comprising a circuit comprising a preamp ground connected to a ground substrate via a ground trace, the ground trace comprising a first leg connected to the ground substrate and a second leg with an open connection extending from a dice line, such that prior to the dice line being formed, the second leg shorts the first leg and creating the dice line removes a portion of the ground substrate and a portion of the second leg, which increases the resistance of the circuit by creating the open connection in the second leg, wherein the open connection comprises a conductive trace ending at an insulating connection.

2. The apparatus of claim 1, wherein the first leg has a greater resistance than the second leg.

3. The apparatus of claim 1, wherein the ground substrate comprises AlTiC.

4. The apparatus of claim 1, wherein the preamp ground is concurrently connected to the ground substrate, a data reader, and a data writer.

5. The apparatus of claim 1, wherein the second leg is positioned between a resistor of the first leg and the preamp ground.

6. The apparatus of claim 1, wherein the ground substrate is positioned on an air bearings surface (ABS).

7. The apparatus of claim 1, wherein the circuit is positioned on a transducing head of a data storage system.

8. The apparatus of claim 1, wherein the circuit is positioned wholly on a single wafer.

9. A system comprising a controller connected to a surface charge control circuit comprising a preamp ground connected to a ground substrate via a ground trace, the ground trace comprising a first leg connected to the ground substrate and a second leg with an open connection extending from a dice line and terminating at an insulated location, such that prior to the dice line being formed, the second leg shorts the first leg and creating the dice line removes a portion of the ground substrate and a portion of the second leg, which increases the resistance of the circuit by creating the open connection in the second leg, wherein the open connection comprises a conductive trace ending at the insulated connection.

10. The system of claim 9, wherein the preamp ground is concurrently connected to a reader heater and a writer heater.

11. The system of claim 9, wherein a writer core is concurrently connected to the ground substrate via a second ground trace.

12. The system of claim 9, wherein the dice line corresponds with a portion of ground substrate that is removed during fabrication.

13. The system of claim 9, wherein the dice line corresponds with a physical edge of a wafer.

14. The system of claim 9, wherein a data reader is connected to the ground substrate via a second ground trace having a lower resistance than the first leg of the ground trace.

15. A method comprising:
  connecting a preamp ground of a circuit to a ground substrate via a ground trace, the ground trace comprising first and second legs each separately connected to the ground substrate; and ground trace;
  removing a portion of the ground substrate and second leg of the ground trace along a dice line to terminate the second leg at an open connection extending from the dice line, such that prior to the dice line being formed, the second leg shorts the first leg and creating the dice line removes a portion of the ground substrate and a portion of the second leg, which increases the resistance of the circuit by creating the open connection in the second leg, wherein the open connection comprises a conductive trace ending at an insulating connection.

16. The method of claim 15, wherein the removal step is performed subsequent to manufacturing and testing of the circuit.

17. The method of claim 15, wherein the removal step is performed subsequent to incorporation of the circuit in a transducing head.

18. The method of claim 15, wherein the removal step is performed subsequent to electrostatic discharge being present proximal the circuit.

* * * * *